Patented May 4, 1954

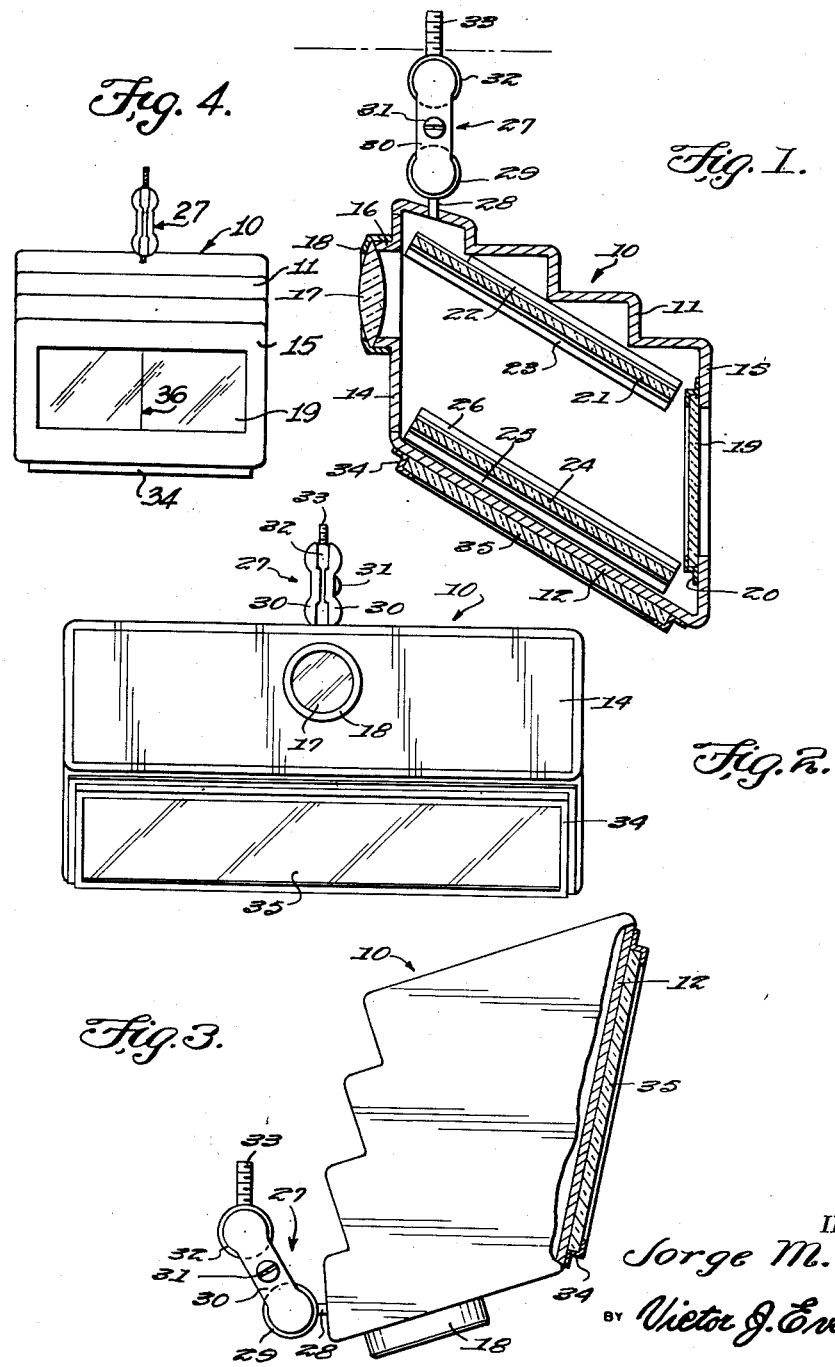

2,677,302

UNITED STATES PATENT OFFICE 2,677,302

VEHICLE ATTACHMENT

Jorge M. Cesar, Monterrey, Nuevo Leon, Mexico

Application April 5, 1951, Serial No. 219,387

1 Claim. (Cl. 88—1)

This invention relates to an attachment for a vehicle, and more particularly to a device for attachment to a vehicle which will reduce the glare hazards.

This invention is an improvement over my invention, Serial No. 173,899, filed July 14, 1950.

The object of the invention is to provide a device for attachment to a vehicle, such as an automobile, whereby the driver of the vehicle will be apprised of the location of an approaching vehicle at night, so as to enable vehicular traffic to move with greater safety.

Another object of the invention is to provide a device that is adapted to be attached to the windshield frame of a vehicle, the device including a pair of reflecting mirrors arranged inside of an adjustably mounted casing, there being an additional mirror mounted on the bottom of the casing which can be used as a rear view mirror during the daytime.

A further object of the invention is to provide a vehicle attachment which is extremely simple and inexpensive to manufacture.

Other objects and advantages will be apparent from the following description.

In the accompanying drawings forming a part of this application, wherein like numerals are used to designate like parts throughout the same:

Figure 1 is a longitudinal vertical sectional view taken through the device of the present invention;

Figure 2 is a front elevational view of the device;

Figure 3 is a side elevational view of the device, with parts broken away and in section.

Figure 4 is an end elevational view of the device looking toward the viewing screen.

Referring in detail to the drawings, the numeral 10 designates a hollow casing which may be fabricated of any suitable material, the casing 10 including a stepped upper wall 11, Figure 1, and an inclined bottom wall 12. The casing further includes a front wall 14 and a rear wall 15.

Extending from the front wall 14 is a collar or neck 16, and a lens 17 is connected to the neck 16 by means of a bracket 18. A screen 19 is connected to the rear wall 15 by means of a bracket 20, and the driver of the vehicle can view the screen 19 while the rays of light from the approaching vehicle are adapted to initially pass through the lens 17.

Arranged within the casing 10 adjacent the upper end thereof is a first reflector or mirror 21 which is held in its proper place by means of clips 22 and 23. Arranged in spaced parallel relation below the reflector 21 is a second reflector or mirror 24 which is held at its proper place by means of clips 25 and 26.

A means is provided for attaching the casing 10 to the vehicle. This means comprises a shank or stem 28 which is secured to the top wall 11, and a ball 29 is secured to the outer end of the shank 28. A pair of spaced plates 30 are arranged in embracing relation with respect to the ball 29, the pair of plates 30 being adjustably or detachably connected together by means of a suitable securing element, such as the screw assembly 31. Arranged between the other ends of the pair of plates 30 is a ball 32, and secured to the ball 32 is a screw member 33 which is adapted to be arranged in engagement with a suitable part of the vehicle frame. It will be seen from Figure 3 that the attaching means, which is indicated in its entirety by the numeral 27, enables the casing 10 to be pivoted to various angular positions.

A frame 34 serves to secure a mirror 35 to the lower surface of the bottom wall 12, and during the daytime the mirror 35 serves as a rear view mirror, whereby the driver of the vehicle can observe the traffic or vehicles to the rear.

In use, the screw member 33 can be attached to any desired or convenient part of the vehicle, and the casing 10 can be adjusted to any desired angular position by means of the mechanism 27. Thus, the casing 10 can pivot due to the pivotal connection between the plates 30 and the balls 29 and 32. The casing 10 is normally positioned for night driving, so that the screen 19 can be readily observed by the operator of the vehicle, and whereby the light rays emitted by the headlights of an approaching vehicle will pass through the lens 17. This light passing through the casing 10 will be diffused, and as shown and described in my copending application, the image of the approaching vehicle will be observed upon the screen 19. The screen 19 may have an indicating line thereon so that the driver of the vehicle will know when the approaching vehicle is in a dangerous position. The mirror 35 can be used with daytime driving as a rear view mirror. The screw member 33 may be attached to the windshield frame of an automobile. The screen 19 has an index mark or line 36 dividing the screen 19 into a safe and unsafe zone.

What is claimed is:

In a vehicle attachment, a casing including a stepped upper wall, and an inclined lower wall, a front and rear wall, a collar extending outwardly from said front wall, a lens mounted in said collar, a pair of spaced reflecting members arranged in said casing, clips for holding said reflecting members in place, one of said reflecting members positioned so as to reflect the beams received through the lens downwardly, the other reflector member positioned so as to reflect the beam rearwardly, a viewing screen having an index mark dividing the screen into a safe and unsafe zone mounted in said rear wall and being larger than said lens, and means for connecting said casing to a vehicle, said means comprising a pair of ball and socket joints joined by a clamping connection, and a mirror secured to the lower surface of said bottom wall.

References Cited in the file of this patent

UNITED STATES PATENTS

| Number | Name | Date |
| --- | --- | --- |
| 1,260,341 | Curtis | Mar. 26, 1918 |
| 1,455,441 | La Hodny | May 15, 1923 |
| 1,478,650 | Hallengren | Dec. 25, 1923 |
| 1,751,567 | Wadsworth | Mar. 25, 1930 |
| 1,777,520 | Gillespie | Oct. 7, 1930 |